US012701518B2

(12) United States Patent (10) Patent No.: US 12,701,518 B2
Nakahira et al. (45) Date of Patent: Aug. 4, 2026

(54) BASE STATION CONTROL SYSTEM, BASE STATION CONTROL METHOD, BASE STATION CONTROL APPARATUS AND PROGRAM

(71) Applicant: NTT, Inc., Tokyo (JP)

(72) Inventors: Toshiro Nakahira, Tokyo (JP); Motoharu Sasaki, Tokyo (JP); Daisuke Murayama, Tokyo (JP); Shota Nakayama, Tokyo (JP); Takatsune Moriyama, Tokyo (JP); Yasushi Takatori, Tokyo (JP)

(73) Assignee: NTT, Inc., Tokyo (JP)

( * ) Notice: Subject to any disclaimer, the term of this patent is extended or adjusted under 35 U.S.C. 154(b) by 296 days.

(21) Appl. No.: 18/683,401

(22) PCT Filed: Sep. 1, 2021

(86) PCT No.: PCT/JP2021/032192
§ 371 (c)(1),
(2) Date: Feb. 13, 2024

(87) PCT Pub. No.: WO2023/032098
PCT Pub. Date: Mar. 9, 2023

(65) Prior Publication Data
US 2024/0349201 A1    Oct. 17, 2024

(51) Int. Cl.
*H04W 52/28* (2009.01)
*H04W 16/18* (2009.01)
*H04W 88/08* (2009.01)

(52) U.S. Cl.
CPC ......... *H04W 52/283* (2013.01); *H04W 16/18* (2013.01); *H04W 88/08* (2013.01)

(58) Field of Classification Search
CPC ... H04W 52/283; H04W 16/18; H04W 88/08; H04W 52/143
See application file for complete search history.

(56) References Cited

U.S. PATENT DOCUMENTS 9,185,664 B2    11/2015    Park et al.
9,572,110 B1    2/2017    Serfaty et al.
(Continued)

FOREIGN PATENT DOCUMENTS

JP          2018-195928          12/2018

OTHER PUBLICATIONS

Takuto Arai, Daisuke Goto, Masashi Iwabuchi, Tatsuhiko Iwakuni, and Kazuaki Maruta, "AMAP: Adaptive Movable Access Point System for Offloading Efficiency Enhancement", NTT Access Network Service Systems Laboratories, NTT Corporation, IEICE Technical Report, vol. 116, No. 46, RCS2016-43, pp. 107-112, May 2016.

(Continued)

*Primary Examiner* — Dominic E Rego
(74) *Attorney, Agent, or Firm* — IPUSA, PLLC

(57) ABSTRACT

In a base station control system, a base station control apparatus includes circuitry configured to select one combination pattern from combination patterns regarding possible combinations of one or more first base stations that are each to couple to one or more terminals among terminals coupled to at least one second base station, based on the number of first terminals and the number of second terminals. The combination patterns include candidate positions of each first base station, and include transmitted power candidates of the first base station that are at the candidate positions.

7 Claims, 9 Drawing Sheets

1

(56) References Cited

U.S. PATENT DOCUMENTS

| | | | | |
|---|---|---|---|---|
| 10,355,835 B2* | 7/2019 | Oyama | | H04L 5/0091 |
| 2004/0131029 A1 | 7/2004 | Tobe et al. | | |
| 2006/0138224 A1* | 6/2006 | Azami | | G07F 7/1008 |
| | | | | 235/451 |
| 2011/0143806 A1 | 6/2011 | Song et al. | | |
| 2012/0127878 A1* | 5/2012 | Kim | | H04L 5/0023 |
| | | | | 370/252 |
| 2013/0065633 A1* | 3/2013 | Sridhara | | H04W 48/20 |
| | | | | 455/525 |
| 2013/0082878 A1* | 4/2013 | Jarvis | | G01S 5/0278 |
| | | | | 342/458 |
| 2013/0252604 A1* | 9/2013 | Huber | | G06Q 20/102 |
| | | | | 455/422.1 |
| 2014/0018084 A1* | 1/2014 | Sato | | H04W 16/20 |
| | | | | 455/446 |
| 2014/0162686 A1* | 6/2014 | Lee | | H04W 64/003 |
| | | | | 455/456.1 |
| 2015/0117183 A1* | 4/2015 | Heo | | H04W 4/50 |
| | | | | 370/242 |
| 2015/0124720 A1 | 5/2015 | Morimoto et al. | | |
| 2015/0146638 A1 | 5/2015 | Ohwatari et al. | | |
| 2015/0156640 A1 | 6/2015 | Nguyen et al. | | |
| 2015/0280888 A1* | 10/2015 | Karsi | | H04L 25/0228 |
| | | | | 370/329 |
| 2016/0308635 A1* | 10/2016 | Zhou | | H04W 52/04 |
| 2017/0245287 A1* | 8/2017 | Lee | | H04W 72/0446 |
| 2017/0303209 A1* | 10/2017 | Na | | H04W 52/346 |
| 2018/0184303 A1 | 6/2018 | Egner et al. | | |
| 2019/0281500 A1 | 9/2019 | Cummings | | |
| 2021/0226650 A1* | 7/2021 | Zhao | | H01Q 5/40 |
| 2023/0189169 A1 | 6/2023 | Vivanco et al. | | |
| 2024/0323864 A1 | 9/2024 | Nakahira et al. | | |

OTHER PUBLICATIONS

Office Action mailed on Jan. 29, 2026 with respect to the related U.S. Appl. No. 18/579,005.
Wi-fi Alliance, https://www.wi-fi.org/ja/discover-wi-fi/wi-fi-location, Searched on Dec. 25, 2023.
Notice of Allowance mailed on Mar. 24, 2026 with respect to the related U.S. Appl. No. 18/294,703.

* cited by examiner

EXISTING BASE STATION

MOVABLE BASE STATION

TERMINAL (1)

| POSSIBLE PATTERN NUMBER | DEPLOYMENT CANDIDATE MATRIX | TRANSMITTED POWER ADJUSTMENT MATRIX (-dB) |
|---|---|---|
| 1 | [A, B] | [0, 0] |
| 2 | [A, C] | [0, 0] |
| ... | ... | ... |
| 45 | [I, J] | [0, 0] |
| 46 | [A, B] | [0, 3] |
| ... | ... | ... |

Fig. 8

| POSSIBLE PATTERN NUMBER | DEPLOYMENT CANDIDATE MATRIX | TRANSMITTED POWER ADJUSTMENT MATRIX (-dB) | (a) NUMBER OF CONNECTED TERMINALS OF EXISTING BASE STATION | (b) NUMBER OF CONNECTED TERMINALS OF MOVABLE BASE STATION | (c) TERMINAL INCAPABLE OF CONNECTING TO BASE STATION (PRESENCE: 0, ABSENCE: 1) | EVALUATION VALUE X |
|---|---|---|---|---|---|---|
| 1 | [A, B] | [0, 0] | [3, 5] | [1, 1] | 1 | 15 |
| 2 | [A, C] | [0, 0] | [3, 5] | [1, 1] | 1 | 15 |
| ... | ... | ... | ... | ... | ... | ... |
| 45 | [I, J] | [0, 0] | [4, 3] | [1, 2] | 1 | 24 |
| 46 | [A, B] | [0, 3] | [3, 5] | [1, 1] | 1 | 15 |
| ... | ... | ... | ... | ... | ... | ... |

Fig. 9

| POSSIBLE PATTERN NUMBER | DEPLOYMENT CANDIDATE MATRIX | TRANSMITTED POWER ADJUSTMENT MATRIX (-dB) | (e) NUMBER OF CONNECTED TERMINALS OF EXISTING BASE STATION | (f) NUMBER OF CONNECTED TERMINALS OF MOVABLE BASE STATION | (i) TERMINAL INCAPABLE OF CONNECTING TO BASE STATION (PRESENCE 0, ABSENCE 1) | EVALUATION VALUE X | (d) MINIMUM VALUE OF RECEPTION POWERS OF EXISTING BASE STATION CONNECTED TERMINALS (dBm) | (e) MINIMUM VALUE OF RECEPTION POWERS OF MOVABLE BASE STATION CONNECTED TERMINALS (dBm) | EVALUATION VALUE Y1 (dBm) | EVALUATION EVALUATION VALUE Y2 (dBm) | ... |
|---|---|---|---|---|---|---|---|---|---|---|---|
| 1 | [A, B] | [0, 0] | [3, 5] | [1, 1] | 1 | 15 | - | - | - | - | - |
| 2 | [A, C] | [0, 0] | [3, 5] | [1, 1] | 1 | 15 | - | - | - | - | - |
| ... | ... | ... | ... | ... | ... | ... | ... | ... | ... | ... | ... |
| 45 | [I, J] | [0, 0] | [4, 3] | [1, 2] | 1 | 24 | [-70, -65] | [-55, -40] | -70 | -65 | ... |
| 46 | [A, B] | [0, 3] | [3, 5] | [1, 1] | 1 | 15 | - | - | - | - | - |
| ... | ... | ... | ... | ... | ... | ... | ... | ... | ... | ... | ... |

BASE STATION CONTROL SYSTEM, BASE STATION CONTROL METHOD, BASE STATION CONTROL APPARATUS AND PROGRAM

TECHNICAL FIELD

The present invention relates to a base station control system, a base station control method, a base station control apparatus, and a program.

BACKGROUND ART

In a case where wireless base stations are evenly deployed in an area in order to efficiently secure an area coverage, it is considered that a communication quality for a specific area deteriorates due to the influence of terminal congestion, shielding, and the like. On the other hand, a technique of dynamically deploying a movable base station in an area having a deteriorated communication quality to ameliorate the deterioration in the communication quality has been studied (Non-Patent Document 1).

CITATION LIST

Non-Patent Document

Non-Patent Document 1: Takuto Arai, Daisuke Goto, Masashi Iwabuchi, Tatsuhiko Iwakuni, and Kazuaki Maruta, "AMAP: Adaptive Movable Access Point System for Offloading Efficiency Enhancement", IEICE Technical Report, vol. 116, no. 46, RCS2016-43, pp. 107-112, May 2016

SUMMARY OF INVENTION

Technical Problem

However, when the movable base station is dynamically deployed, if power that is transmitted from the movable base station and is received by each of terminals is excessively large, compared to other base stations, many terminals are autonomously connected to the movable base station, and excessive deviation in the terminal connection may occur, which may result in reductions in the communication quality.

FIG. 1 is a diagram for describing a problem of a conventional technology. In FIG. 1, an exemplary case in which two movable base stations are additionally installed in an environment where there are three existing base stations and 11 terminals will be described as follows. (1) of FIG. 1 illustrates a state before the movable base stations are deployed, and (2) illustrates a state after the movable base stations are deployed.

In (1) in which the state is held before the movable base stations are deployed, one terminal is connected to an existing base station on the left-hand side, and five terminals are connected to each of the other two existing base stations. A broken line connecting each terminal and the existing base station indicates a connection relationship between the terminal and the existing base station. In this state, the two existing base stations are congested. Therefore, by deploying one movable base station for each of the two existing base stations, the congestion is resolved or alleviated.

In the conventional technology, a deployment position of the movable base station is calculated by clustering 10 terminals connected to any one of the two congested existing base stations. As a result, for example, movable base stations are installed as illustrated in (2). In (2), each cluster is indicated by a curved frame line, and an example in which the movable base station is deployed at a center of gravity of each cluster is shown.

When a given terminal can receive signals from a plurality of base stations, the given terminal operates to connect to a base station such that the highest received power is obtained in a general wireless system. Therefore, when the movable base stations are deployed as illustrated in (2), five terminals are connected to one movable base station, and two terminals are connected to the other movable base station. As a result, congestion of the existing base stations in which the congestion occurs in (1) is resolved, but one movable base station becomes congested. As described above, according to the conventional technology, there is a possibility that the number of terminals that are connected to each base station is excessively unequal (existing base station or movable base station).

The present invention has been made in view of the above points, and an object of the present invention is to reduce an unequal number of terminals connected to each base station.

Solution to Problem

Therefore, in order to solve the above problem, in a base station control system including first base stations whose deployment positions have not been determined, and a base station control apparatus, the base station control apparatus includes: a generation unit configured to generate patterns of a plurality of combinations of possibilities of deployment positions of each of the first base stations and possibilities of transmission power for a plurality of combinations of terminals corresponding to a number of first base stations among a plurality of terminals connected to an existing second base station on the basis of a position of each terminal related to the combinations; a calculation unit configured to calculate, for each of the patterns, a number of first terminals connected to the first base stations and a number of second terminals connected to the second base station in a case where the first base stations are deployed at deployment positions related to the pattern and the first base stations output a transmission power related to the pattern; and a selection unit configured to select one possibility from among the plurality of possibilities on the basis of the number of first terminals and the number of second terminals.

Advantageous Effects of Invention

It is possible to reduce an unequal number of terminals connected to each base station.

BRIEF DESCRIPTION OF DRAWINGS

FIG. 2 is a diagram illustrating a configuration example of a communication system 1 according to an embodiment of the present invention.

FIG. 7 is a diagram illustrating an example of possible patterns.

FIG. 8 is a diagram illustrating an example of a calculation result of an evaluation value X of each possible pattern.

FIG. 9 is a diagram illustrating an example of a calculation result of an evaluation value Yi of each possible pattern.

DESCRIPTION OF EMBODIMENTS

Figure 1:
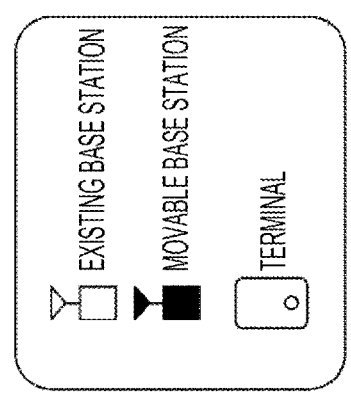
FIG. 1 is a diagram for describing a problem of a conventional technology.
Figure 1:
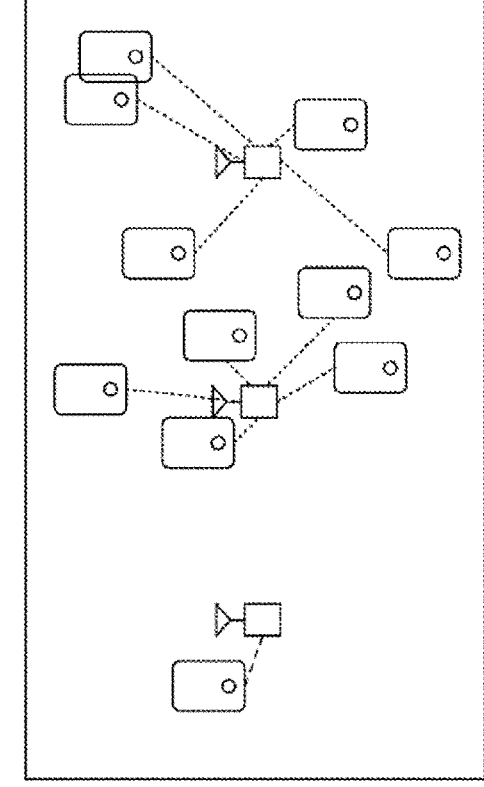
Figure 1:
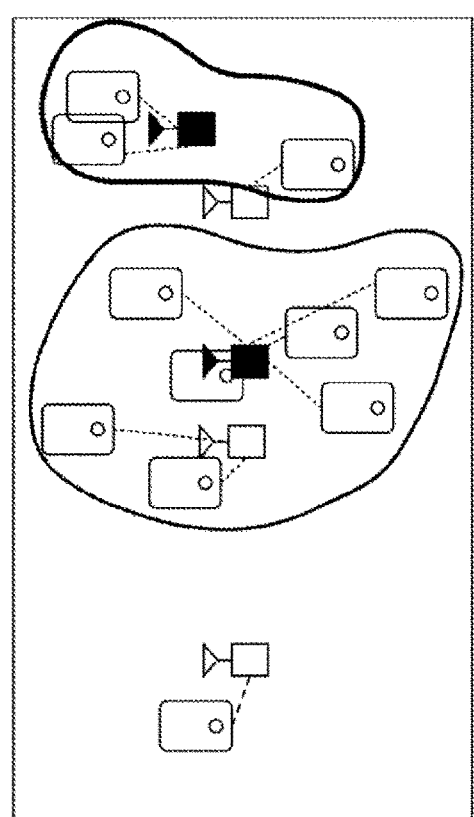
Figure 2:
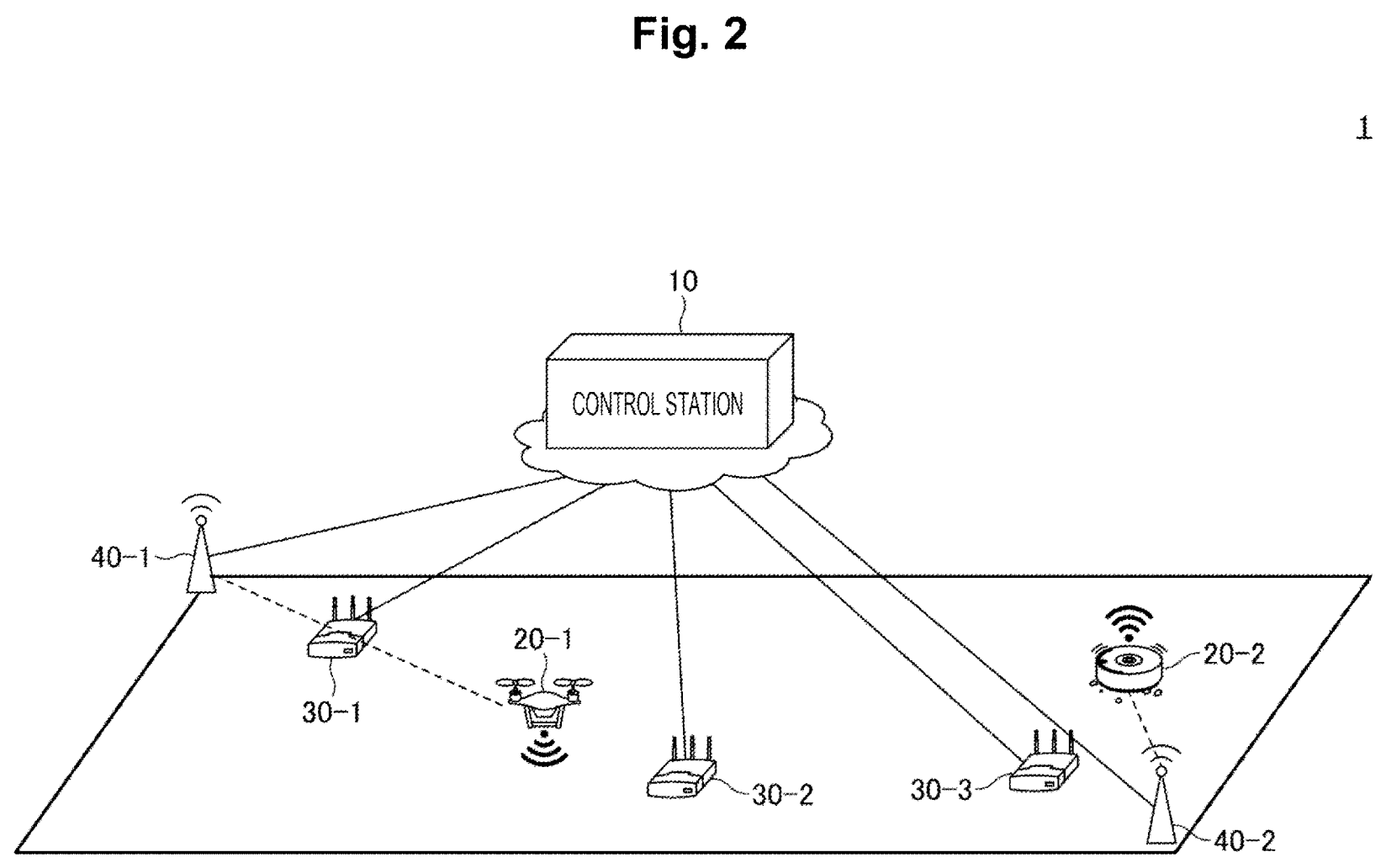

Hereinafter, embodiments of the present invention will be described with reference to the drawings. FIG. 2 is a diagram illustrating a configuration example of a communication system in an embodiment of the present invention. As illustrated in FIG. 2, the communication system 1 includes one or more existing base stations 30, one or more movable base stations 20, one or more relay base stations 40, a control station 10, and the like. Note that a base station refers to a base station (access point) in wireless communication (for example, a wireless LAN).

The existing base station 30 is an existing base station in the present embodiment. In the present embodiment, the existing base station 30 is not targeted for movement, but the existing base station 30 may be movable.

The movable base station 20 is a base station that is movable, and is a base station that is newly deployed (deployment position is not determined) in the present embodiment. For example, in a case or the like where communications with a certain existing base station 30 becomes congested, the movable base station 20 is dynamically deployed. Note that a drive approach to move the movable base station 20 is not limited to a specific device. For example, a vehicle, a drone, or the like may be used as the drive approach. In addition, the movable base station 20 may be configured to move on a rail provided in advance.

The relay base station 40 is a base station that relays communication between the movable base station 20 and the control station 10. The relay base station 40 is connected to the movable base station 20 by wireless communications. Therefore, the movable base station 20 is movable within a range in which wireless communications with the relay base station 40 can be performed.

Note that, hereinafter, in a case where the existing base station 30 and the movable base station 20 are not distinguished, they are simply referred to as "base stations". Each terminal 50 is connected to any base station by autonomous control. The autonomous control is, for example, a control in which connection to a closer base station is performed and in which connection to a base station that allows for relatively large received power when there are a plurality of base stations having substantially the same distance to a given terminal.

The control station 10 includes one or more computers that control deployment of the movable base station 20 and control the transmission power of the movable base station 20. The control station 10 is connected to each existing base station 30 and each relay base station 40 via a network (wired or wireless). The control station 10 controls the deployment of the movable base station 20 and the transmitted power of the movable base station 20, on the basis of information collected from each base station and terminal via the network.

Figure 3:
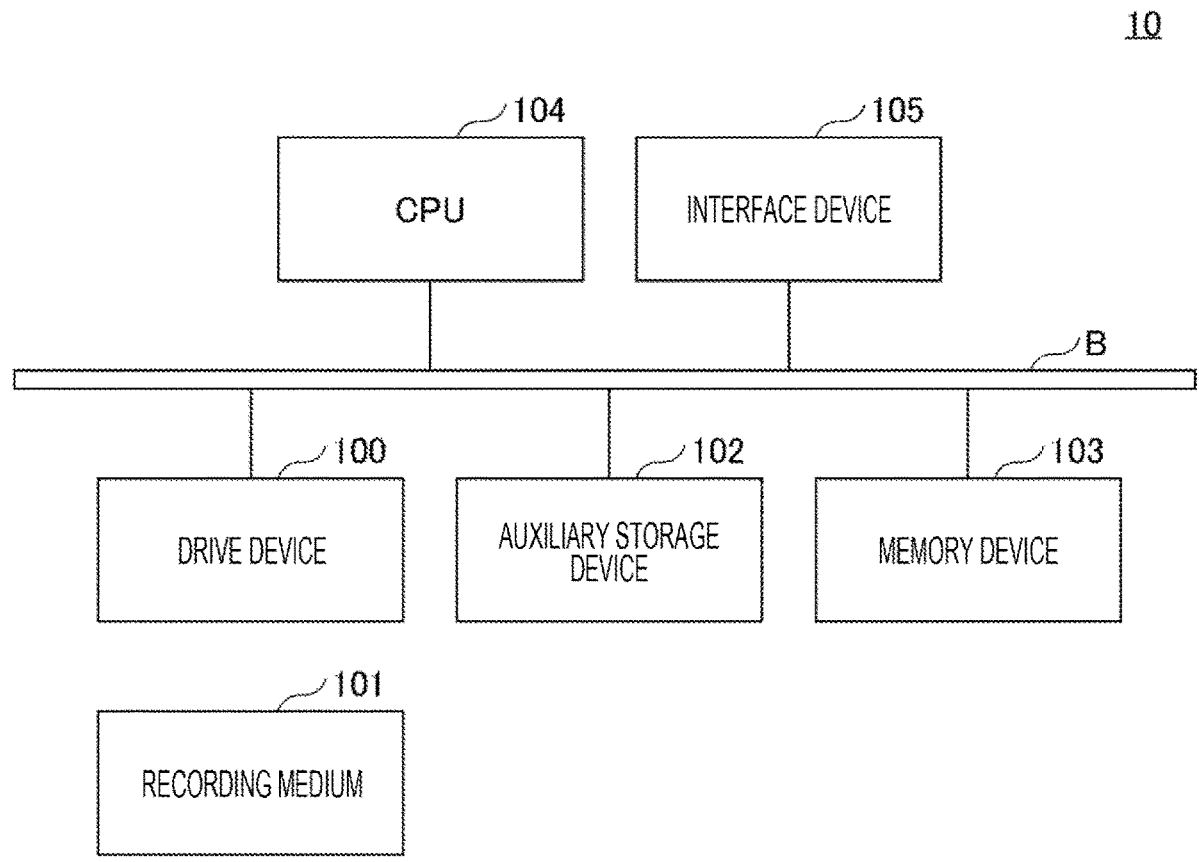
FIG. 3 is a diagram illustrating a hardware configuration example of a control station 10 in the embodiment of the present invention.

FIG. 3 is a diagram illustrating a hardware configuration example of the control station 10 in the embodiment of the present invention. The control station 10 of FIG. 3 includes a drive device 100, an auxiliary storage device 102, a memory device 103, a CPU 104, an interface device 105, and the like which are connected to one another by a bus B.

A program for realizing processing in the control station 10 is provided by a recording medium 101 such as a CD-ROM. When the recording medium 101 storing the program is set in the drive device 100, the program is installed on the auxiliary storage device 102 from the recording medium 101 via the drive device 100. Here, the program is not necessarily installed from the recording medium 101 and may be downloaded from another computer via a network. The auxiliary storage device 102 stores the installed program and also stores necessary files, data, and the like.

When an instruction to start the program is received, the memory device 103 reads and stores the program from the auxiliary storage device 102. The CPU 104 executes a function related to the control station 10 according to a program stored in the memory device 103. The interface device 105 is used as an interface for connecting to a network.

Figure 4:
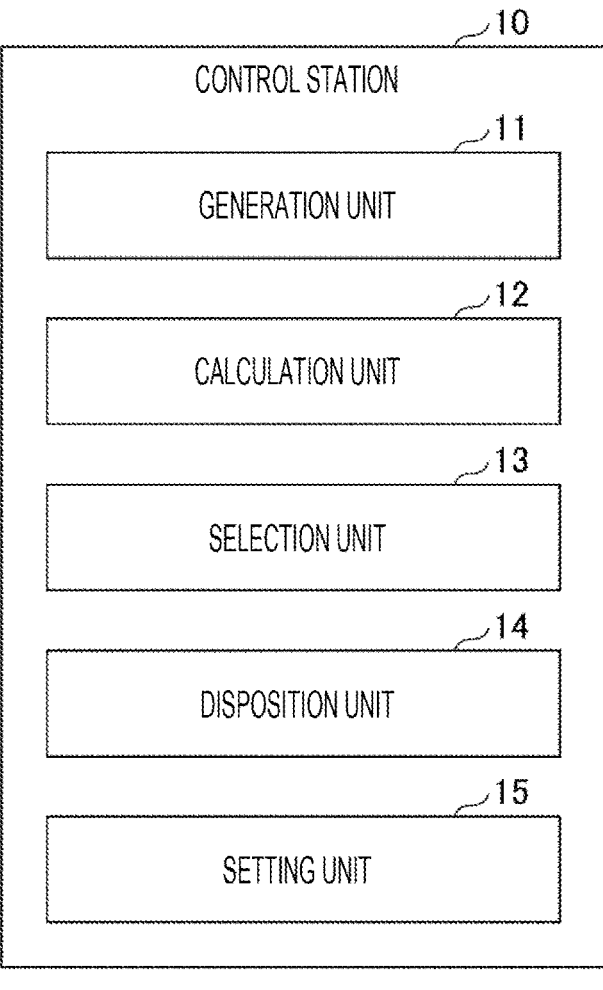
FIG. 4 is a diagram illustrating a functional configuration example of the control station 10 in the embodiment of the present invention.

FIG. 4 is a diagram illustrating a functional configuration example of the control station 10 in the embodiment of the present invention. In FIG. 4, the control station 10 includes a generation unit 11, a calculation unit 12, a selection unit 13, and a disposition unit 14. Each of these units is implemented by the CPU 104 executing one or more programs installed in the control station 10.

Figure 5:
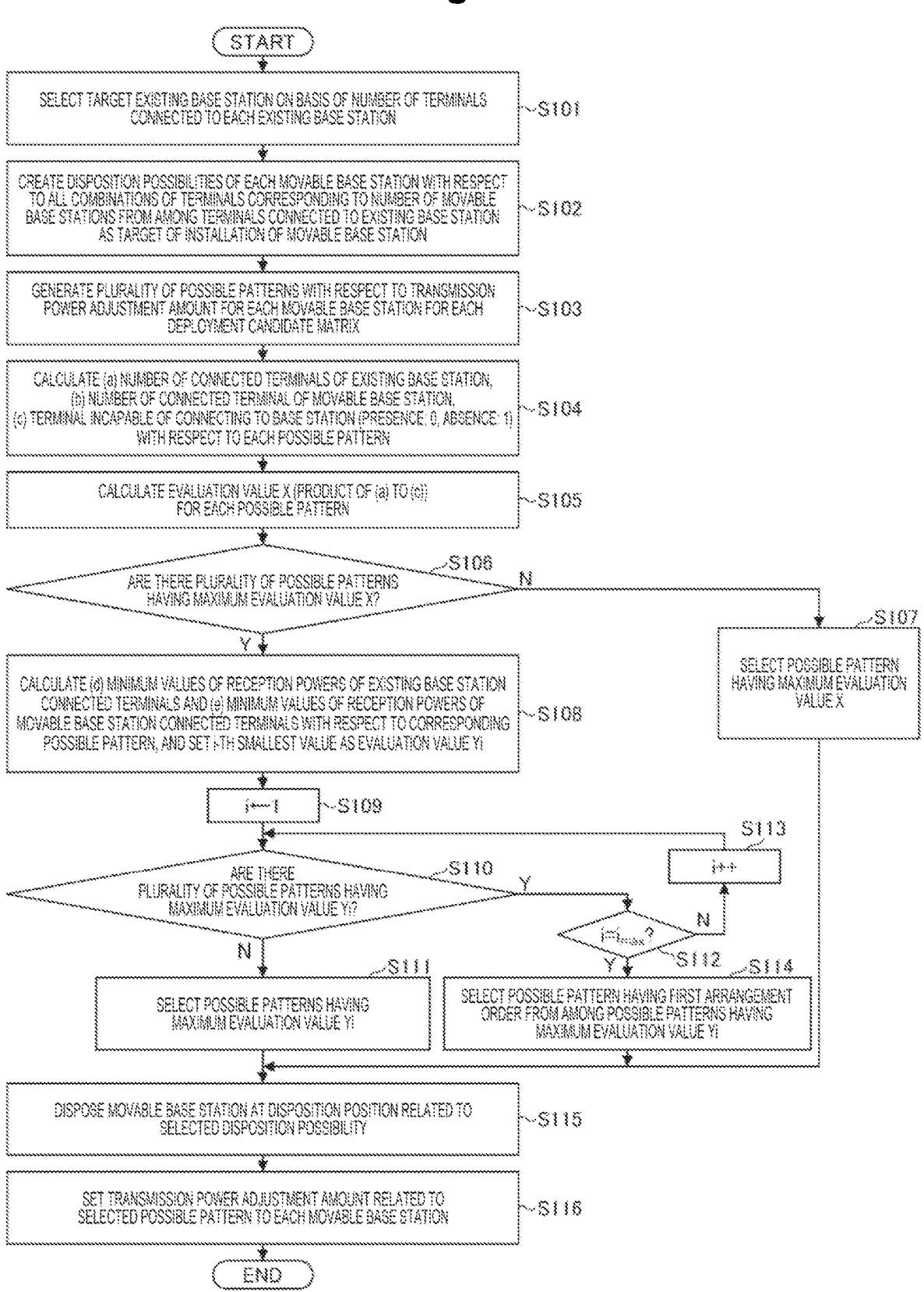
FIG. 5 is a flowchart for describing an example of a processing procedure executed by the control station 10.

Hereinafter, a processing procedure executed by the control station 10 will be described. FIG. 5 is a flowchart for describing an example of the processing procedure executed by the control station 10.

In step S101, the generation unit selects an existing base station 30 (whose load will be reduced by the movable base station 20) (hereinafter, referred to as a "target existing base station 30") as a target of installation of a movable base station 20 on the basis of the number of connected terminals of each of a plurality of existing base stations 30. For example, some existing base stations 30 in which terminal connections are relatively congested (the number of connected terminals is relatively large) are selected as target existing base stations 30. In this case, the generation unit determines whether or not terminal connection of each existing base station 30 is congested. For example, the generation unit determines that an existing base station 30 in which the number of terminals 50 to be connected (the number of connected terminals) is equal to or greater than a predetermined threshold value is congested.

Figure 6:
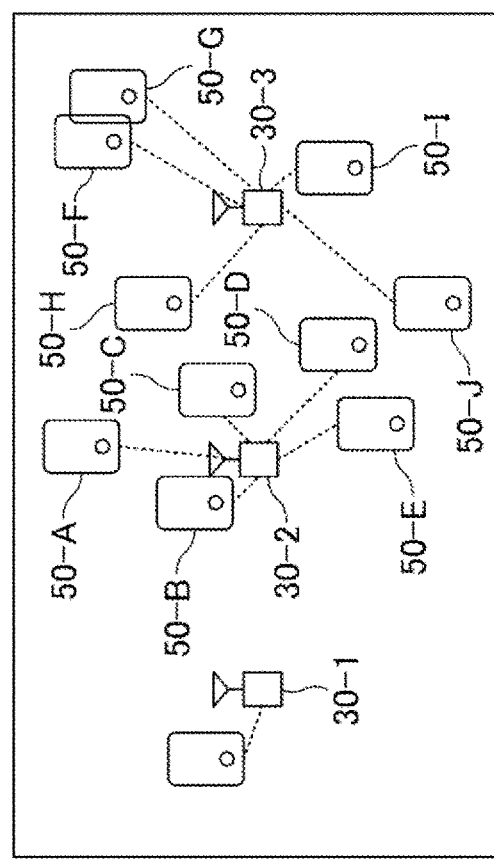
FIG. 6 is a diagram illustrating a specific example of a connection state of a terminal 50 to an existing base station 30.

FIG. 6 is a diagram illustrating a specific example of connection states of terminals 50 to existing base stations 30. In the present embodiment, it is assumed that three existing base stations 30 are installed, and two movable base stations 20 are additionally installed in a state where 11 terminals 50 are connected to any of the existing base stations 30. In the figure, a broken line connecting a terminal 50 and an existing base station 30 indicates a connection relationship between the terminal 50 and the existing base station 30 (which existing base stations 30 is connected to the terminal 50). Therefore, in the example of FIG. 6, the number of connected terminals of an existing base station 30-1 is 1, the number of connected terminals of an existing base station 30-2 is 5, and the number of connected terminals of an existing base station 30-3 is 5.

In the example of FIG. 6, when the threshold value used to determine that congestion of the existing base station 30 is 5, it is determined that two existing base stations 30, that is, the existing base stations 30-2 and 30-3 are congested. Therefore, these two existing base stations 30 are selected as target existing base stations 30.

Alternatively, as another determination method, if the number of connected terminals is included in upper α % of all the existing base stations 30, it may be determined that it is congested, and if it is not included, it may be determined that it is not congested. α is a parameter, and for example, when α=50, the existing base stations 30 of upper 50% are in a congestion state.

Alternatively, as another determination method, an existing base station 30 in which the number of connected terminals exceeds the average number of connected terminals of all the existing base stations 30 may be determined to be in a congestion state.

Subsequently, the generation unit 11 generates deployment position candidates (hereinafter, referred to as "deployment candidates") of movable base stations 20, taking into account a plurality of (all) combinations of terminals 50 that correspond to the number of movable base stations 20, where the plurality of combinations of terminals 50 are obtained from a group of terminals 50 that are each connected to any target existing base station 30 (S102). For example, for each terminal 50 in a certain combination of terminals, one or more positions in the vicinity of the terminal 50 are set as deployment candidates of one movable base station 20. Therefore, a combination (hereinafter, referred to as a "deployment candidate matrix") of deployment candidates of movable base stations 20 is generated for each combination of terminals 50 that correspond to the number (for example, two) of movable base stations 20. Here, the vicinity of the terminal 50 is defined, for example, by one or more positions that are randomly selected from an area of a predetermined distance from the terminal 50. Alternatively, the position where a direction and the distance from the terminal 50 are defined by respective predetermined values may be in the vicinity of the terminal 50.

Subsequently, for each deployment candidate matrix determined in step S102 (for each combination of the terminals 50), the generation unit 11 generates candidates of patterns (hereinafter, referred to as "possible patterns") regarding deployment and transmitted power of each movable base station 20 in which a plurality of combinations of transmitted power adjustment for each movable base station 20 are combined with respect to the corresponding deployment possibility sequence (S103). The transmitted power adjustment refers to relative power that is obtained by decreasing from maximum transmitted power. For example, since the transmitted power to be set varies depending on the country, the transmitted power is set using a relative value that is obtained based on a maximum value in the present embodiment. However, an absolute value of transmitted power may be used instead of the transmitted power adjustment.

FIG. 7 is a diagram illustrating an example of possible patterns. As illustrated in FIG. 7, one possible pattern includes a possible pattern number, a deployment candidate matrix, a transmitted power adjustment matrix, and the like. The possible pattern number is an identification number of the possible pattern. The deployment candidate matrix is a combination of deployment candidates for movable base stations 20. In FIG. 7, values of deployment candidates are indicated by identification information (A to J) of terminals 50. For example, in [A, B] which is a deployment candidate matrix for the possible pattern number=1, A in a first column indicates that a deployment candidate for one movable base station 20 is in the vicinity of a terminal 50-A, and B in a second column indicates that a deployment candidate for the other movable base station 20 is in the vicinity of a terminal 50-B. The transmitted power adjustment matrix is a combination of transmitted power adjustment for movable base stations 20. For example, in [0, 0] which is transmitted power adjustment matrix for the possible pattern number=1, 0 in a first column indicates transmitted power adjustment for one movable base station 20, and 0 in a second column indicates transmitted power adjustment for the other movable base station 20.

Subsequently, the calculation unit 12 calculates evaluation parameters of each possible pattern, on the basis of the position of each base station (the movable base station 20 and the existing base station 30), the position of each terminal 50 (each terminal 50 connected to a target base station), and the like (S104). In the present embodiment, the evaluation parameters are (a) the number of connected terminals of an existing base station, (b) the number of connected terminals of a given movable base station, and (c) one or more terminals that are incapable of connecting to any base station.

(a) The number of terminals connected to an existing base station, for a certain possible pattern, refers to the number of terminals 50 connected to a target existing base station 30 in a case where each movable base station 20 is deployed at a deployment position indicated by a deployment candidate matrix related to the possible pattern, and each movable base station 20 outputs transmitted power indicated by the transmitted power adjustment matrix related to the possible pattern.

(b) The number of terminals connected to a movable base station, for a certain possible pattern, refers to the number of terminals 50 connected to the movable base station 20 in a case where each movable base station 20 is deployed at a deployment position indicated by the deployment candidate matrix related to the possible pattern and each movable base station 20 outputs transmitted power indicated by the transmitted power adjustment matrix related to the possible pattern.

(c) The one or more terminals incapable of connecting to any base station, for a certain possible pattern, refers to one or more terminals 50 that cannot be connected to any of movable base stations 20 and the existing base stations 30, among terminals 50 present in an area in which the existing base stations 30 are deployed when each movable base station 20 is deployed at a deployment position indicated by the deployment candidate matrix related to the possible pattern and each movable base station 20 outputs transmitted power indicated by the transmitted power adjustment matrix related to the possible pattern. A value set in (c) is 0 when there is a terminal 50 corresponding to the one or more terminals incapable of connecting to any base station is present, and when there is no terminal 50 corresponding to the one or more terminals incapable of connecting to any base station, the value set in (c) is 1.

With respect to (a) and (b), the calculation unit 12 calculates power that is received by each terminal 50 and is transmitted from a corresponding station among the target existing base stations 30 and the movable base stations 20, on the basis of a distance between the terminal 50 and the corresponding station among the target existing base stations 30 and the movable base stations 20; and transmitted power of the corresponding station among the target existing base stations 30 and the movable base stations 20. Then, the calculation units 12 calculates the number of terminals connected to each base station when one or more terminals 50 are connected to a given base station that allows the largest received power. At this time, the transmitted power of a movable base station 20 may be a predetermined value that is different from the transmitted power of the target existing base station 30, or may be the same value as the transmitted power of the target existing base station 30.

With respect to (c), the calculation unit 12 determines the presence or absence of a terminal 50 in which the maximum value of reception powers (the maximum value of the reception power from the target existing base station 30 and the reception powers from the movable base stations 20) calculated for each base station with respect to each terminal 50 is below a predetermined threshold value (required reception power) as a determination result with respect to (a) and (b).

Subsequently, the calculation unit 12 calculates an evaluation value X on the basis of (a) to (c) for each possible pattern (S105). Here, as an example, a product ((a)×(b)×(c)) of (a), (b), and (c) is calculated as the evaluation value X.

FIG. 8 is a diagram illustrating an example of a calculation result of the evaluation value X of each possible pattern. FIG. 8 illustrates an example of the values of (a) to (c) and an example of the evaluation value X for each possible pattern. Note that, among two values [x, y] in (a), x is a value for one of two existing base stations 30, and y is a value for the other existing base station 30. Similarly, among two values [x, y] in (b), x is a value for one of the two movable base stations 20, and y is a value for the other movable base station 20.

Subsequently, the selection unit 13 determines whether or not there are a plurality of possible patterns having the maximum evaluation value X (S106). If there is one possible pattern having the maximum evaluation value X (N in S106), the selection unit 13 selects the possible pattern (S107) and proceeds to step S115. Note that a possible pattern having the maximum evaluation value X is a possible pattern in which a deviation in the numbers of connected terminals between base stations is small and there is no terminal incapable of connecting to a base station, and can specify a deployment position and transmitted power adjustment that allows reductions in unequal numbers of terminals connected to the movable base stations 20.

On the other hand, if there are a plurality of possible patterns having the maximum evaluation value X (Y in S106), the selection unit 13 calculates, for each possible pattern having the maximum evaluation value X, (d) minimum values of received power of existing base station connected terminals and (e) minimum values of received power of movable base station connected terminals, and sets an i-th smallest value among (d) and (e) as an evaluation value Yi (S108). Note that (d) the minimum values of received power of existing base station connected terminals indicate a minimum value of powers of received signals from existing base stations 30 in each existing base station connected terminal. (e) The minimum value of received power of a movable base station connected to terminal refers to the minimum value of powers of received signals from the movable base stations 20 in each movable base station connected terminal. Note that the power that is received by each terminal 50 and is transmitted from a given base station can be calculated on the basis of the distance between the given base station and the terminal 50, the transmitted power of the given base station, and the like.

FIG. 9 is a diagram illustrating an example of a calculation result of the evaluation value Yi of each possible pattern. FIG. 9 further illustrates (d) a maximum value of a distance between an existing base station connected to one or more terminals and an existing base station, (e) a maximum value of a distance between a movable base station connected to one or more terminals and a movable base station, and the evaluation value Yi (an evaluation value Y1 and an evaluation value Y2) with respect to a plurality of possible patterns for which the maximum evaluation value X is obtained. The evaluation value Y1 is a greater value of values in (d) and (e). The evaluation value Y2 is a smaller value of values in (d) and (e).

Subsequently, the selection unit 13 substitutes 1 as a variable i (S109). Subsequently, the selection unit 13 determines whether or not there are a plurality of possible patterns having a minimum evaluation value Yi (S110). If there is one possible pattern for which the minimum evaluation value Yi is obtained (N in S110), the selection unit 13 selects the possible pattern (S111), and proceeds to step S115.

On the other hand, if there are a plurality of possible patterns for which the minimum evaluation value Yi is obtained (Y in S110), the selection unit 13 determines whether the value of the variable i matches $i_{max}$ (S112). $i_{max}$ is the total number (here, 4) of target existing base stations 30 and movable base stations 20. If i does not match $i_{max}$ (N in S112), the selection unit 13 adds 1 to i (S113), and repeats step S110 and subsequent steps.

If i matches $i_{max}$ (Y in S112), the selection unit 13 selects a possible pattern having the first arrangement order in FIG. 9 (having the smallest possible pattern number) from among possible patterns having the minimum evaluation value Yi (S114), and proceeds to step S115. According to step S108 and subsequent steps, a possible pattern having a higher minimum reception power in a terminal 50 can be selected. According to the example of FIG. 9, a possible pattern having a possible pattern number of 45 is selected.

In step S115, the disposition unit 14 controls the deployment of each movable base station 20 to be at the deployment position indicated by the deployment position matrix related to the possible pattern selected in step S107, S111, or S114.

Subsequently, the setting unit 15 sets the transmitted power adjustment in the transmitted power adjustment matrix in the selected possible pattern, to each movable base station 20 (S116).

As described above, according to the present embodiment, it is possible to reduce a deviation in the number of terminals connected to each base station. As a result, improvement in communication quality can be expected.

Note that, in a case where a base station can set different transmission powers for a beacon signal and a data signal, the signal transmission power of the data signal may not be lowered and only the transmission power of the beacon signal may be lowered at the time of lowering the transmission power.

In addition, deployment possibilities for the movable base stations 20 may be limited in advance in consideration of an area in which it is possible to perform communication of a backhaul line accommodating the movable base stations 20.

In addition, in a case where adjustment with respect to the height direction of the movable base station 20 can be performed, a plurality of deployment possibilities for the movable base station 20 may also be prepared in the height direction.

Further, in a case where the movable base station 20 can change a beam transmission direction (direction of analog beamforming, selection of an antenna pattern of digital beamforming, and the like), possible patterns may be further distinguished depending on a case where the beam transmission direction is switched.

In addition, the present embodiment may be applied not only to the movable base stations 20 but also to deployment of fixed base stations and the like. For example, the present embodiment may be applied to determination of a deployment position and a transmission power regarding a newly installed fixed base station.

Note that, in the present embodiment, the movable base station 20 is an example of a first base station. The existing base station 30 is an example of a second base station. The control station 10 is an example of a base station control apparatus.

Although the embodiments of the present invention have been described in detail above, the present invention is not limited to such specific embodiments, and various modifications and changes can be made within the scope of the gist of the present invention described in the claims.

REFERENCE SIGNS LIST

1 Communication system
10 Control station
11 Generation unit
12 Calculation unit
13 Selection unit
14 Disposition unit
15 Setting unit
20 Movable base station
30 Existing base station
40 Relay base station
50 Terminal
100 Drive device
101 Recording medium
102 Auxiliary storage device
103 Memory device
104 CPU
105 Interface device
B Bus

The invention claimed is:

1. A base station control system comprising:
one or more first base stations whose placement positions are undetermined; and
a base station control apparatus including circuitry configured to generate, for each of possible combinations of the first base stations that are each to couple to one or more terminals among terminals coupled to at least one second base station, combination patterns each including
   candidate positions of each first base station, and
   transmitted power candidates of the first base station that is at the candidate positions, based on positions of the one or more terminals,
   determine, for each of the combination patterns regarding each possible combination of the first base stations, (i) the number of first terminals to be coupled to each of the first base stations and (ii) the number of second terminals to be coupled to the second base station, upon occurrence of a condition in which the first base stations are provided at the respective candidate positions, in conjunction with a condition in which each of the first base stations outputs transmitted power of the transmitted power candidates regarding the combination pattern, and
select one combination pattern from the combination patterns regarding possible combinations of the first base stations, based on the number of first terminals and the number of second terminals.

2. The base station control system according to claim 1, wherein the at least one second base station is configured to be selected from a plurality of existing base stations, based on whether the number of terminals coupled to each of the plurality of existing base stations is greater than or equal to a threshold.

3. The base station control system according to claim 1, wherein upon occurrence of a condition in which the terminals include one or more third terminals that are not to be coupled to both the first base stations and the second base station, the circuitry is configured to
   determine, for each of the transmitted power candidates regarding each possible combination of the first base stations, the number of third terminals, and
   select a given transmitted power candidate of each first base station, from the transmitted power candidates regarding each combination pattern of the first base stations, based on the number of first terminals, the number of second terminals, and the number of third terminals.

4. The base station control system according to claim 1, wherein upon occurrence of a condition in which one transmitted power candidate of a given first base station is not selected, the circuitry is configured to select a given transmitted power candidate of the given first base station, based on (i) power to be received by one or more first terminals, the power being transmitted from the given first base station and (ii) power to be received by one or more second terminals, the power to be received by the second terminals being transmitted from the second base station, and
   wherein the power to be received by the first base stations and the second base stations is specified for each transmitted power candidate.

5. A base station control method executed by a base station control apparatus for controlling one or more first base stations whose placement positions are undetermined, the base station control method comprising:
generating, for each of possible combinations of the first base stations that are each to couple to one or more terminals among terminals coupled to at least one second base station, combination patterns each including
   candidate positions of each first base station, and
   transmitted power candidates of the first base station that is at the candidate positions, based on positions of the one or more terminals;
determining, for each of the combination patterns regarding each possible combination of the first base stations, (i) the number of first terminals to be coupled to each of the first base stations and (ii) the number of second terminals to be coupled to the second base station, upon occurrence of a condition in which the first base stations are provided at the respective candidate positions, in conjunction with a condition in which each of the first base stations outputs transmitted power of the transmitted power candidates regarding the combination pattern; and
selecting one combination pattern from the combination patterns regarding possible combinations of the first base stations, based on the number of first terminals and the number of second terminals.

6. A base station control apparatus for controlling one or more first base stations whose placement positions are undetermined, the base station control apparatus comprising:

circuitry configured to generate, for each of possible combinations of the first base stations that are each to couple to one or more terminals among terminals coupled to at least one second base station, combination patterns each including candidate positions of each first base station, and transmitted power candidates of the first base station that is at the candidate positions, based on positions of the one or more terminals, determine, for each of the combination patterns regarding each possible combination of the first base stations, (i) the number of first terminals to be coupled to each of the first base stations and (ii) the number of second terminals to be coupled to the second base station, upon occurrence of a condition in which the first base stations are provided at the respective candidate positions, in conjunction with a condition in which each of the first base stations outputs transmitted power of the transmitted power candidates regarding the combination pattern, and select one combination pattern from the combination patterns regarding possible combinations of the first base stations, based on the number of first terminals and the number of second terminals.

7. A non-transitory computer readable medium storing a program that causes a computer to execute the base station control method of claim 5.

\* \* \* \* \*